(12) United States Patent
Gao et al.

(10) Patent No.: US 10,669,168 B2
(45) Date of Patent: Jun. 2, 2020

(54) METHOD AND SYSTEM FOR TREATING BRINE WASTE WATER

(71) Applicants: CHINA PETROLEUM & CHEMICAL CORPORATION, Beijing (CN); Fushun Research Institute of Petroleum and Petrochemicals, SINOPEC CORP., Fushun, Liaoning (CN)

(72) Inventors: Huijie Gao, Liaoning (CN); Danfeng Sun, Liaoning (CN); Zhihua Guo, Liaoning (CN); Mingxiang Chen, Liaoning (CN)

(73) Assignees: CHINA PETROLEUM & CHEMICAL CORPORATION, Beijing (CN); Fushun Research Institute of Petroleum and Petrochemicals, SINOPEC CORP., Fushun, Liaoning (CN)

( * ) Notice: Subject to any disclaimer, the term of this patent is extended or adjusted under 35 U.S.C. 154(b) by 205 days.

(21) Appl. No.: 15/807,252

(22) Filed: Nov. 8, 2017

(65) Prior Publication Data
US 2018/0148350 A1    May 31, 2018

(30) Foreign Application Priority Data

Nov. 29, 2016  (CN) .......................... 2016 1 1072961
Nov. 29, 2016  (CN) .......................... 2016 1 1072962

(51) Int. Cl.
*C02F 1/44*   (2006.01)
*C02F 1/58*   (2006.01)
(Continued)

(52) U.S. Cl.
CPC .............. *C02F 1/444* (2013.01); *C02F 1/586* (2013.01); *C02F 5/00* (2013.01); *C02F 9/00* (2013.01);
(Continued)

(58) Field of Classification Search
None
See application file for complete search history.

(56) References Cited

U.S. PATENT DOCUMENTS 4,141,825 A    2/1979   Conger

FOREIGN PATENT DOCUMENTS

CN    103374524 A    10/2013
CN    103374525 A    10/2013
(Continued)

OTHER PUBLICATIONS

Zhongming Han et al.; "Process for zero discharge of high salinity wastewater in coal-base chemical enterprise"; Environmental Protection of Chemical Industry, vol. 36 No. 2, 2016, pp. 193-199.

*Primary Examiner* — Krishnan S Menon
(74) *Attorney, Agent, or Firm* — Novick, Kim & Lee, PLLC; Allen Xue

(57) ABSTRACT

The present invention relates to a method for zero-release treatment of brine waste water, comprising: (1) pretreatment; (2) reverse osmosis treatment; (3) advanced oxidation treatment; (4) biochemical treatment; (5) electrodialysis concentration; (6) circulating crystallization. Compared with the prior art, the method for zero-release treatment of brine waste water provided in the present invention realizes zero release or near zero release of waste water, improves salt recovery efficiency, can recover high-quality sodium sulfate, mirabilite and sodium chloride, and turns crystalline salts into a resource; the membrane treatment unit can operates stably in the process for a long operation period at
(Continued)

a low cost, and the entire process has high economic efficiency.

13 Claims, 1 Drawing Sheet

(51) Int. Cl.
    *C02F 5/00*     (2006.01)
    *C02F 9/00*     (2006.01)
    *C02F 1/469*     (2006.01)
    *C02F 1/72*     (2006.01)
    *C02F 1/52*     (2006.01)
    *C02F 101/12*     (2006.01)
    *C02F 103/36*     (2006.01)
    *C02F 3/34*     (2006.01)
    *C02F 1/04*     (2006.01)
    *C02F 3/12*     (2006.01)
    *C02F 1/22*     (2006.01)
(52) U.S. Cl.
    CPC ................ *C02F 1/048* (2013.01); *C02F 1/22* (2013.01); *C02F 1/441* (2013.01); *C02F 1/4693* (2013.01); *C02F 1/722* (2013.01); *C02F 3/1268* (2013.01); *C02F 3/341* (2013.01); *C02F 2001/5218* (2013.01); *C02F 2101/12* (2013.01); *C02F 2103/36* (2013.01); *C02F 2103/365* (2013.01); *C02F 2209/08* (2013.01); *C02F 2301/08* (2013.01); *C02F 2305/026* (2013.01); *Y02W 10/15* (2015.05)

(56) References Cited

FOREIGN PATENT DOCUMENTS

| | | |
|---|---|---|
| CN | 103508602 A | 1/2014 |
| CN | 103739132 A | 4/2014 |
| CN | 104016529 A | 9/2014 |
| CN | 104230124 A | 12/2014 |
| CN | 105000755 A | 10/2015 |
| CN | 105502787 A | 4/2016 |
| CN | 105565569 A | 5/2016 |
| CN | 105624094 A | 6/2016 |
| CN | 105753248 A | 7/2016 |
| CN | 205653294 U | 10/2016 |
| CN | 205687741 U | 11/2016 |
| CN | 106315991 A | 1/2017 |
| EP | 1803689 A1 | 12/2006 |
| JP | 10-272494 A | 10/1998 |
| JP | 2001-070989 A | 3/2001 |
| WO | 2008047084 A2 | 4/2008 |
| WO | 2010018249 A1 | 2/2010 |

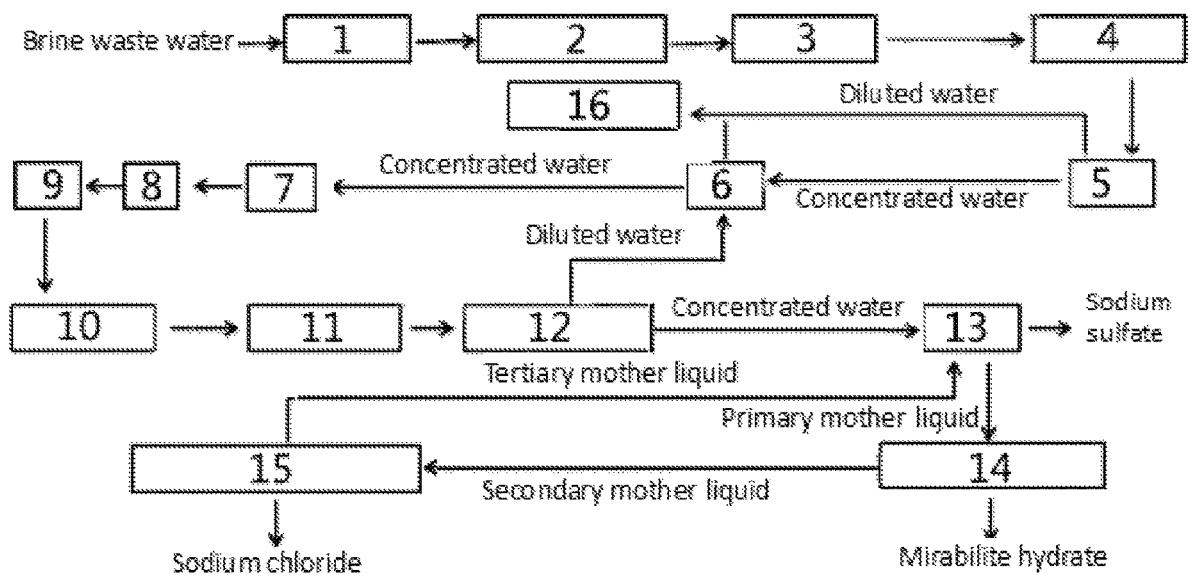

METHOD AND SYSTEM FOR TREATING BRINE WASTE WATER

CROSS REFERENCE TO RELATED APPLICATIONS

This application claims priorities to Chinese Application No. 201611072961.9 and 201611072962.3, both filed on Nov. 29, 2016 and entitled "Method for Treating Brine Waste Water", which are specifically and entirely incorporated by reference.

FIELD OF THE INVENTION

The present invention relates to the environmental protection, in particular to a method for treating brine waste water, especially a method for zero-release treatment of high-salinity waste water in the coal chemical engineering industry and a treatment system for the same.

BACKGROUND OF THE INVENTION

Coal chemical engineering is a process in which coal is used as the raw material and processed chemically into gas, liquid or solid fuel and chemical products. The coal chemical engineering mainly includes coal gasification, liquefaction, carbonization, and tar processing and carbide acetylene processing, etc. Coal chemical projects consume water heavily and produce a large quantity of waste water. However, in China, most coal chemical projects are located in the Northwest China region, where the water resources and pollutant receiving water bodies are deficient. As the environmental protection policies of the state are adjusted continuously, the waste water produced in coal chemical enterprises must be reused as far as possible to achieve zero release. The waste water in the coal chemical engineering usually can be categorized into organic waste water and brine waste water, wherein, the brine waste water mainly include circulating waste water and drainage water from chemical water stations, etc. To reuse the waste water as far as possible, usually the organic waste water is also introduced into the brine waste water treatment system for further demineralization treatment after primary treatment, secondary treatment, and advanced treatment, to ensure that the treated organic waste water meets the requirement for water quality of circulating water and replenishing water.

The brine waste water recycling treatment mainly includes two types of techniques: membrane separation techniques and thermal evaporation techniques. Owing to the fact that the approach of obtaining reused water directly from brine waste water with thermal evaporation techniques involves huge energy consumption, membrane separation techniques are the mainstream techniques in the art. The major membrane for separation techniques include osmotic membrane (reverse osmosis, forward osmosis), bipolar membrane, dialysis membrane, electrodialysis membrane, microwave membrane, ultrafiltration membrane, nanofiltration membrane, and biological membrane, etc. Usually one of the membrane techniques can be used separately, or several membrane techniques can be used in combination for the treatment, depending on the source of the waste water. A key technical challenge for membrane techniques is the membrane contamination problem, which has severe impact on the service efficiency and service life of the membranes owing to the complex composition of the waste water.

In addition, the objective of the brine waste water treatment techniques is zero release of waste water, which requires that the salts in the waste water should be recovered in the form of solid. Owing to the complex salt components in the waste water, it is difficult to obtain salts that meet the quality criteria for sale. The salts obtained with most of the existing methods are mixed salts, which are difficult to sell and use; consequently, solid wastes that are difficult to handle are formed. Though the salts in the waste water may be treated respectively with different separation and purification methods theoretically to obtain high-purity single salts, the process is complex and requires increased cost, and is not affordable in the economic aspect, owing to a large quantity of components. Especially, the existence of organic contaminants and nitrogenous contaminants in the waste water not only bring membrane contamination, but also introduce difficulties in the comprehensive treatment and recycling of mixed salts; as a result, true near-zero release can't be realized. Therefore, treating the organic contaminants and nitrogenous contaminants in the brine waste water efficiently with appropriate techniques is a prerequisite for steady operation of the follow-up membrane reduction units, and comprehensive utilization of the resultant mixed salts may be possible only if the pollutant concentration in the concentrated liquid is decreased as far as possible.

The patent document CN104016529A has disclosed a method for treatment of brine waste water based on a multi-stage reflux inverse-pole electrodialyzer in coal chemical engineering, which can concentrate the concentrated water by 10 times or more times and can improve the fresh water production efficiency to 85% or higher. By means of ozone oxidation, multi-stage membrane filtering and multi-stage reflux inverse-pole electrodialysis, the technique improves the fresh water recovery efficiency, and alleviates the problem of electrodialyzer membrane contamination to some extent, but the pretreatment cost is high, the stability of the pretreatment membranes is poor, the reused water obtained with the electrodialyzer still contains some salts, the overall effect is unsatisfactory, and there is no treatment solution for the strong brine, and zero release is not realized. The patent document CN104230124A has disclosed a process for sorted collection and separate treatment of waste water according to the quality of the waste water in coal chemical engineering, as well as a special device, which can be used to obtain industrial salts while improving the recovery efficiency of water. However, in that process, three reverse osmosis units are used separately, and advanced pretreatment measures such as ion exchange are required for pretreatment; at present, using a membrane separation unit to separate purified water and organic concentrated liquid is difficult to attain an ideal effect; the resultant industrial salts are mixed salts, which are difficult to sell or use.

The patent document CN103508602A has disclosed a process for zero-release treatment of high-salinity industrial waste water that integrates membrane treatment and evaporating crystallization. The industrial waste water is pretreated by ultrafiltration and then fed by a high-pressure pump to a reverse osmosis unit, the water outputted from the osmosis side is reused, and the concentrated liquid produced after several filtering cycles is treated by electrodialysis treatment, the material concentrated by electrodialysis is treated by evaporation and crystallization to obtain brine sludge and condensed water, the brine sludge is post-treated, the condensed water is reused, and the fresh water produced through electrodialysis is reused. That method uses reverse osmosis and electrodialysis in simple combination, so that reverse osmosis and electrodialysis play their own roles respectively. However, it is difficult to obtain fresh water that meets the criteria for reuse through electrodialysis, and the process involves high energy consumption and severe membrane contamination; the stability of the entire device is poor; in addition, the resultant solid salts are still mixed salts.

The patent document CN105565569A has disclosed enhanced advanced concentration system and process for high-salinity industrial waste water, in which high-salinity industrial waste water is conditioned in a conditioning tank, settled in a softening sedimentation tank, filtered in a V-type filtering tank, further filtered in an ultrafiltration device, concentrated in a primary reverse osmosis unit, deionized in a deionizer, and separated in a nanofiltration device, wherein: the concentrated water produced in the nanofiltration device is concentrated in a frequently changing pole electrodialysis device, the water produced in the frequently changing pole electrodialysis device is oxidized in an advanced oxidation device and then is sent to a main water tank, and the concentrated water is crystallized in a freezing crystallization system to obtain sodium sulfate crystals; the water produced in the nanofiltration device is concentrated in a secondary reverse osmosis unit, and then is further concentrated in a frequently changing pole electrodialysis device, the water produced in the frequently changing pole electrodialysis device is oxidized in an advanced oxidation device and then is sent to the main water tank, and the concentrated water is crystallized in a MVR evaporating crystallization device to obtain sodium chloride crystals. That method combines membrane techniques including nanofiltration, frequently changing pole electrodialysis, and reverse osmosis, etc., but hasn't effectively integrated the effects of different membrane techniques; the pretreatment requires advanced treatment techniques such as ion exchange, and the cost is high; though sodium chloride crystals and sodium sulfate crystals are obtained respectively, it is proved through analysis and test that some high-concentration brine waste water has to be released to ensure the purity of the resultant crystalline salts with that method; that is to say, zero release can't be realized with that method; in addition, the salt recovery efficiency attained with that method should be further improved.

The patent document CN105000755A has disclosed a "zero-release" industrial waste water treatment system and a treatment method. The method comprises: pretreating the streams of waste water, and then feeding the pretreated water into a "ultrafiltration+reverse osmosis" unit for desalting treatment by reverse osmosis, so as to ensure that the water quality meets the criteria for reuse; treating the strong brine produced in the reverse osmosis by biochemical treatment to remove concentrated COD and ammonia nitrogen substances in the water; feeding the treated water into a second "ultrafiltration" unit for ultrafiltration; then feeding the treated water into a monovalent and bivalent nanofiltration separation device to separate monovalent sodium chloride and bivalent sodium sulfate; feeding the resultant two streams of water into a second reverse osmosis unit and a third reverse osmosis unit for desalting treatment respectively, to ensure the fresh water meets the criteria for reuse; treating the water outputted from the second reverse osmosis unit and the third reverse osmosis unit by frequent changing-pole electrodialysis; returning the water produced through electrodialysis to the monovalent and bivalent nanofiltration separation device, and treating the concentrated water by evaporating crystallization.

In general, further optimization is required for the existing treatment process of brine waste water, especially brine waste water in the coal chemical engineering industry, in the aspect of comprehensive technical effects, including waste water recovery efficiency, industry salt conversion to resources, salt recovery efficiency, stable operation of membrane unit, reduction of product cost, and realization of zero release, etc.

SUMMARY OF THE INVENTION

To overcome the drawbacks in the existing brine waste water treatment processes in the prior art, the present invention provides a method for treatment of brine waste water, which realizes zero release or near zero release of waste water in the coal chemical engineering industry and improves salt recovery efficiency at the same time; in addition, the process of treatment with a multi-stage membrane treatment unit can operate stably for a long period at a low cost, and the entire process has high economic efficiency.

The inventor of the present invention has found: not only the recovery efficiency of the salts but also the stability of the treatment process and the service cycle of the membranes can be improved by carrying out reverse osmosis treatment through a two-stage reverse osmosis treatment process that includes intermediate pressure reverse osmosis treatment and follow-up high pressure reverse osmosis treatment, treating the concentrated water by biochemical treatment before the electrodialysis treatment, and returning the diluted water from the electrodialysis treatment to the high pressure reverse osmosis treatment section.

In one aspect, the present invention provides a method for treatment of brine waste water, which comprises the following steps:

(1) pretreatment: the pretreatment includes softening, coagulation and sedimentation, rough filtration and ultrafiltration procedures, and the water outputted is treated by reverse osmosis treatment;

(2) reverse osmosis treatment: a membrane treatment process that combines intermediate pressure reverse osmosis and high pressure reverse osmosis and is resistant to membrane contamination is used, the water outputted from the pretreatment process is treated by intermediate pressure reverse osmosis first, producing a first diluted water and a first concentrate water, the first diluted water produced through the intermediate pressure reverse osmosis is sent to be reused, the first diluate concentrated water produced in the intermediate pressure reverse osmosis is treated by high pressure reverse osmosis then, producing a second diluted water and a second concentrate water, the second diluted water produced through the high pressure reverse osmosis is sent to be reused, and the second concentrated water produced in the high pressure reverse osmosis is treated by biochemical treatment;

(3) biochemical treatment: carried out in a membrane bioreactor containing a salt-tolerant microbial inoculum and a microbial growth promoter therein, to reduce or even eliminate COD and total nitrogen;

(4) electrodialysis concentration: the water outputted from the biochemical treatment is treated by softening, coagulation and sedimentation, rough filtration and ultrafiltration treatment, and then is treated by electrodialysis, producing a third diluted water and a third concentrate water, the third diluted water produced through the electrodialysis is used together with the third concentrated water produced in the intermediate pressure reverse osmosis as feeding water input to the high pressure reverse osmosis, and the third concentrated water produced in the high pressure reverse osmosis is treated by circulating crystallization.

In another aspect, the present invention provides a brine waste water treatment system, comprising a first pretreatment unit, a reverse osmosis treatment unit, a biochemical treatment unit, a second pretreatment unit, an electrodialysis unit, and a crystallization unit, wherein the reverse osmosis treatment unit comprises an intermediate pressure reverse osmosis treatment membrane device and a high pressure reverse osmosis treatment membrane device, an water outlet of the first pretreatment unit is connected with a first diluted water inlet of the intermediate pressure reverse osmosis treatment membrane device, a first concentrated water outlet of the intermediate pressure reverse osmosis treatment membrane device is connected with a water inlet of the high pressure reverse osmosis treatment membrane device, a second concentrated water outlet of the high pressure reverse osmosis treatment membrane device is connected with the biochemical treatment unit, a water outlet of the biochemical treatment unit is connected with a water inlet of the second pretreatment unit, a water outlet of the second pretreatment unit is connected with the electrodialysis unit, a third diluted water outlet of the electrodialysis unit is connected with a water inlet of the high pressure reverse osmosis treatment membrane device, a third concentrated water outlet of the electrodialysis unit is connected with a water inlet of the crystallization unit.

The method provided in the present invention employs a two-stage reverse osmosis treatment process that includes intermediate pressure reverse osmosis treatment and follow-up high pressure reverse osmosis treatment, treats the concentrated water by biochemical treatment before electrodialysis treatment, and returns the diluted water after electrodialysis treatment to the high pressure reverse osmosis treatment section, and thereby attains the following remarkable effects:

1. The membrane unit can operate stably for a long period while the concentration multiple and the water output rate are ensured, and the problems of contamination of the membranes (especially the electrodialysis membrane and the high pressure reverse osmosis membrane) and shortened service life of the membranes (especially the electrodialysis membrane and the high pressure reverse osmosis membrane) incurred by frequent regeneration of the membranes are effectively controlled. With the technical scheme in the present invention, the membrane unit can operate stably for 3 years or longer time. It is proved in tests and simulations that the membrane unit usually can only serve for 1~1.5 years under the same pretreatment conditions if the above synergistic and combined process is not used.

2. The cost of the pretreatment unit is low, the demanding requirement for the quality of water inputted to the membrane unit is decreased, and the operation cost can be greatly reduced by virtue of the water pretreatment. For example, the present invention can just use low-cost pretreatment such as softening, flocculation and sedimentation, rough filtration, and ultrafiltration methods, can operate stably, don't require high-cost pretreatment units in the prior art, such as ion exchange unit and nanofiltration unit, etc.

In addition, the preferred embodiment of the present invention further has the following beneficial effects:

3. Using specific salt-tolerant microbial inoculum and promoter in combination, the biochemical treatment unit can carry out biochemical treatment of the high-salinity concentrated water produced in the high pressure reverse osmosis and remove ammonia nitrogen in the waste water efficiently, so as to reduce contamination to the electrodialysis membrane and the high pressure reverse osmosis membrane and improve the service life and operation stability of the membranes; and can effectively remove nitrate radicals in the waste water and the sodium nitrate component in the resultant mixed salts, and thereby decrease the difficulty in treatment of the mixed salts. Moreover, the biochemical treatment unit can remove the organic contaminants partially, and thereby reduce the treatment cost in the front-end Fenton oxidation unit and the follow-up units (e.g., sedimentation unit).

4. The salt separation scheme avoids discharge of any waste liquid while ensuring the purity of the crystalline salts, and thereby truly realizes zero release. The sodium sulfate is crystallized into two types of crystals, i.e., sodium sulfate crystals and mirabilite crystals, so that other impurities in the waste water are reasonably distributed to different crystallized products, and thereby the problem of unacceptable purity of the crystalline salts incurred by circulation of all mother liquid is avoided; thus, zero release of waste water is realized while the quality of the crystalline salts is ensured. It is proved by tests that the purities of the two types of resultant crystalline salts (sodium sulfate and sodium chloride) will be unacceptable if the sodium sulfate is separated in a single form of crystalline salt; in such a case, saline waste liquid has to be discharged to ensure acceptable purities of the two types of crystalline salts. Therefore, the preferred technical scheme in the present invention improves the recovery efficiency of the salts while realizing zero release or near zero release of the waste water in coal chemical engineering, and can recover high-quality sodium sulfate, mirabilite, and sodium chloride, and thereby realizes conversion of crystalline salts to a resource. Besides, since the salt separation procedure is arranged at the terminal end of the process, the process is simplified and the construction cost is reduced.

BRIEF DESCRIPTION OF DRAWINGS

FIG. 1 is a flow diagram of the method and system for treatment of brine waste water provided in the present invention.

DETAILED DESCRIPTION OF THE EMBODIMENTS

Hereunder some embodiments of the present invention will be detailed. It should be understood that the embodiments described here are only provided to describe and explain the present invention, but shall not be deemed as constituting any limitation to the present invention.

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined to obtain one or more new numeric ranges, which shall be deemed as having been disclosed specifically in this document.

In the present invention, a membrane treatment process that combines intermediate pressure reverse osmosis and high pressure reverse osmosis is used, the diluted water produced in the intermediate pressure reverse osmosis (also called the first diluted water hereafter) may be reused, the concentrated water produced in the intermediate pressure reverse osmosis (also called the first concentrated water hereafter) is treated by high pressure reverse osmosis separately or together with the diluted water produced in the electrodialysis unit (also called the third diluted water hereafter), the diluted water produced in the high pressure reverse osmosis (also called the second diluted water hereafter) may be reused, and the concentrated water produced in the high pressure reverse osmosis (also called the second concentrated water hereafter) is treated subsequently to recover the salts in it.

Through two-stage reverse osmosis, the waste water can be concentrated effectively, the volume of waste water to be treated by the follow-up devices can be reduced, and thereby the load on the follow-up devices can be decreased.

In the present invention, reuse refers to that the water quality complies with the Code for Quality of Circulating Cooling Water in Industry (GB50050-2007) and can be reused in industrial installations or for other purposes.

In the present invention, the pressure difference between the high pressure reverse osmosis treatment and the intermediate pressure reverse osmosis treatment is not smaller than 0.5 MPa; preferably, the pressure difference between the high pressure reverse osmosis treatment and the intermediate pressure reverse osmosis treatment is 0.5-5 MPa, more preferably is 1.5-4 MPa, e.g., 1.5, 1.6, 1.8, 2, 2.1, 2.5, 3, 3.5, 3.8, or 4 MPa. Within that preferred range, the stability of the process and the service life of the membranes can be further improved.

In the present invention, the pressure of the intermediate pressure reverse osmosis treatment preferably is 0.5-5 MPa, further preferably is 1-3 MPa, e.g., 1, 1.5, 2, 2.2, 2.5 or 3 MPa.

In the present invention, the pressure of the high pressure reverse osmosis treatment preferably is 2.5-8 MPa, further preferably is 3-6 MPa, e.g., 3, 3.2, 3.5, 4, 4.3, 4.5, 5, 5.1, 5.2, 5.4 or 5 MPa.

In the present invention, to improve the service cycle and operation stability of the device, preferably, the reverse osmosis treatment membrane used in the high pressure reverse osmosis treatment and the reverse osmosis treatment membrane used in the intermediate pressure reverse osmosis treatment are contamination-resistant reverse osmosis membranes. Those membranes are available commercially.

According to the present invention, the conditions of the high pressure reverse osmosis treatment and the intermediate pressure reverse osmosis treatment and the types of the membranes preferably ensure that the diluted water after treatment has the properties of COD lower than 30 mg/L, TDS lower than 300 mg/L and hardness lower than 10 mg/L, and meets the requirements for water quality of circulating cooling water in the industry.

Preferably, both the intermediate pressure reverse osmosis and the high pressure reverse osmosis employ a cross flow filtering scheme.

After treated through the two-stage reverse osmosis and separation process described above, the TDS in the second concentrated water produced in the high pressure reverse osmosis is 50,000 mg/L or higher, wherein, the COD is usually higher than 500 mg/L, and the concentration of nitrate nitrogen is higher than 300 mg/L.

In the present invention, TDS is an acronym of Total Dissolved Solids and refers to the total content of solids in the water, in unit of g/L. It represents the quantity (milligram) of total dissolved solids in 1 liter water, or the total ionic concentration in 1 liter water, usually can be expressed by a formula TDS=$[Ca^{2+}+Mg^{2+}+Na^{+}+K^{+}]+[HCO_3^{-}+SO_4^{2-}+Cl^{-}]$, and usually can be measured directly with a TDS test pen or conductivity meter.

In the present invention, the pretreated brine waste water meets the general requirement for input to reverse osmosis treatment; thus, the water produced in the reverse osmosis treatment can meet the criteria for ordinary reverse osmosis treatment and maintain the normal service life of the reverse osmosis treatment membrane; preferably, the hardness of the pretreated brine waste water doesn't exceed 200 mg/L, the COD is lower than 70 mg/L, and the turbidity is lower than 3 NTU.

In the present invention, the $BOD_5$ is measured with the method specified in HJ505-2009 "Water Quality—Determination of Biochemical Oxygen Demand after 5 Days ($BOD_5$) for Dilution and Seeding Method". The COD is measured with the method specified in GB 11914-89 "Water Quality—Determination of Chemical Oxygen Demand—Dichromate Method", and the turbidity is measured with the method specified in the international standard ISO7027-1984 "Water Quality—Determination of Turbidity". The concentration of nitrate nitrogen is measured with the method specified in GB7480-87 "Water Quality—Determination of Nitrate Nitrogen—Spectrophotometric Method with Phenol Disulfonic Acid". The ammonia nitrogen concentration is measured with the method specified in GB7478-87 "Water Quality—Determination of Ammonium—Distillation and Titration Method"; the total nitrogen concentration is measured with the method specified in GB11894-89 "Water Quality—Determination of Total Nitrogen—UV Spectrophotometric Method—Alkaline Potassium Persulfate Digestion Method".

Specifically, the above indicators can be attained by treating the brine waste water by softening, flocculation, sedimentation and filtering. Furthermore, the softening, flocculation and sedimentation process may be carried out in a high-density sedimentation tank. The filtering includes rough filtration and ultrafiltration, wherein, the rough filtration may be carried out in a V-type filtering tank, and the average pore size of the ultrafiltration membrane used for ultrafiltration preferably is 1-100 nm.

Furthermore, a chemical dosing device is provided at the front end of the high-density sedimentation tank to dose a softener and a flocculant.

The softener may be one or more of calcium hydroxide, sodium hydroxide, and sodium carbonate. The dose may be determined according to the quality of the brine waste water, to adjust the pH to about 11.

The coagulant may be any substance that can drive the fine solid particles in the water to aggregate into large particles that can be removed by filtering in the water treatment field. For brine waste water in coal chemical engineering, a suitable coagulant preferably is a composite coagulant of polyferric sulfate (PFS) and polyacrylamide (PAM), wherein, the concentration of PFS is 5-200 mg/L, and the concentration of PAM is 0.5-12 mg/L. That coagulant is available commercially.

Furthermore, a chemical dosing device is also provided at the outlet of the high-density sedimentation tank to add an acidic substance and a non-oxidizing bactericide, the acidic substance is dosed till the pH of the water is adjusted to 6.5-7.5; specifically, the acidic substance may be hydrochloric acid and/or sulfuric acid.

According to the present invention, the pretreatment may further comprises procedures such as deoiling and homogenization treatment, etc., according to the quality of the incoming water, to ensure the pretreated brine waste water meets the requirement for input to reverse osmosis. The homogenization procedure may be carried out in the conditioning tank.

The pretreatment in the present invention doesn't include any procedure that requires an ion-exchange column or nanofiltration device; instead, the pretreatment only include the above-mentioned simple homogenization, softening, flocculation, sedimentation, and filtering procedures, which are low in cost and easy to operate.

According to the present invention, the biochemical treatment may be a procedure that uses any biochemical method. Preferably, in the biochemical treatment, a salt-tolerant microbial inoculum and a microbial growth promoter are dosed into an existing membrane bioreactor, to reduce or even eliminate COD and total nitrogen. The conditions of the biochemical treatment ensure that the waste water after biochemical treatment has the following indicators: the removal ratio of ammonia nitrogen in the waste water is 90% or higher, the COD is reduced to 200 mg/L or lower, the nitrate nitrogen concentration is decreased to 100 mg/L or lower, preferably 50 mg/L or lower. Here, the removal ratio of ammonia nitrogen refers to the ratio of the ammonia nitrogen content after the biochemical treatment to the ammonia nitrogen content before the biochemical treatment.

In the present invention, in view that the biochemical treatment is for waste water that has very high salt content, in particular the second concentrated water produced in the high pressure reverse osmosis, the salt-tolerant microbial inoculum must be a biochemical microbial inoculum that is tolerant to high-salinity water treatment. The inventor of the present invention has found: a salt-tolerant microbial inoculum that contains *Kocuria palustris* FSDN-A and/or *Staphylococcus cohnii* FSDN-C and *Paracoccus denitrificans* DN-3 and/or *Methylobacterium phyllosphaerae* SDN-3 is especially suitable for removing ammonia nitrogen from waste water that has very high salt content, in particular the second concentrated water produced in the high pressure reverse osmosis treatment in the present invention, and can achieve a removal ratio of ammonia nitrogen as high as 98% or above; thus, the biochemical treatment can alleviate the load of ammonia nitrogen treatment in the follow-up electrodialysis and ammonia nitrogen treatment of the third diluted water produced in the electrodialysis and returned to the high pressure reverse osmosis membrane section, and thereby improve the service life of the electrodialysis membrane and the high pressure reverse osmosis membrane, i.e., improve the service life of the entire treatment device. Therefore, the salt-tolerant microbial inoculum in the present invention preferably contains *Kocuria palustris* FSDN-A and/or *Staphylococcus cohnii* FSDN-C, and also contains either or both of *Paracoccus denitrificans* DN-3 and *Methylobacterium phyllosphaerae* SDN-3; further preferably, the volume ratio of *Kocuria palustris* FSDN-A and/or *Staphylococcus cohnii* FSDN-C to *Paracoccus denitrificans* DN-3 and *Methylobacterium phyllosphaerae* SDN-3 is 1:0.1-2, even further preferably is 1:0.3-1.5. Wherein, the *Kocuria palustris* FSDN-A and *Staphylococcus cohnii* FSDN-C were preserved on Jul. 14, 2011 in China General Microbiological Culture Collection Center (CGMCC) and numbered as CGMCC No. 5061 and CGMCC No. 5062 respectively; the *Paracoccus denitrificans* DN-3 and *Methylobacterium phyllosphaerae* SDN-3 were preserved on Mar. 11, 2010 in CGMCC and numbered as CGMCC No. 3658 and CGMCC No. 3660 respectively. The above-mentioned salt-tolerant microbial inoculum is mentioned in patent document CN201210130645.8 or CN201210130644.3.

The quantity of the salt-tolerant microbial inoculum is 0.01-0.1 vol % of the waste water to be treated by biochemical treatment. In a continuous treatment mode, the dose of the salt-tolerant microbial inoculum preferably is 00.01-00.1% of the volume of the treated waste water per hour.

The microbial growth promoter may be prepared according to the patent documents CN201410585430.4, CN201410585449.9 and CN201410585485.5.

In the present invention, the mix ratio of the active components in the microbial growth promoter preferably is as follows: metal salt: 40-100 pbw, preferably 50-80 pbw, polyamine substance: 5-30 pbw, preferably 10-20 pbw, organic acid hydroxylamine: 0.5-15 pbw, preferably 2-10 pbw. The metal salt is composed of calcium salt, copper salt, magnesium salt and/or ferrous salt, wherein, the metal salt may be composed of calcium salt, magnesium salt and copper salt, in which the molar ratio of $Ca^{2+}$ to $Mg^{2+}$ to $Cu^{2+}$ is (5-15):(5-25):(0.5-5), preferably is (8-12):(10-20):(1-4); or the metal salt may be composed of calcium salt, ferrous salt and copper salt, in which the molar ratio of $Ca^{2+}$ to $Fe^{2+}$ to $Cu^{2+}$ is (5-15):(1-8):(0.5-5), preferably is (8-12):(2-6):(1-4); or the metal salt may be composed of calcium salt, magnesium salt, ferrous salt and copper salt, in which the molar ratio of $Ca^{2+}$ to $Mg^{2+}$ to $Fe^{2+}$ to $Cu^{2+}$ is (5-15):(5-25):(1-8):(0.5-5), preferably is (8-12):(10-20):(2-6):(1-4).

In the present invention, the calcium salt in the microbial growth promoter is $CaSO_4$ and/or $CaCl_2$, preferably is $CaSO_4$; the magnesium salt is $MgSO_4$ and/or $MgCl_2$, preferably is $MgSO_4$; the ferrous salt is $FeSO_4$ and/or $FeCl_2$, preferably is $FeSO_4$; the copper salt is $CuSO_4$ and/or $CuCl_2$, preferably is $CuSO_4$.

In the present invention, the polyamine substance in the microbial growth promoter preferably is spermine, spermidine, or a mixture of them. The organic acid hydroxylamine is hydroxylamine formate, hydroxylamine acetate, or a mixture of them.

In the present invention, the microbial growth promoter is dosed so that the total concentration of the active components of the microbial growth promoter in the waste water treatment system is 1-20 mg/L, preferably is 5-15 mg/L. Namely, in relation to 1 L waste water to be treated by biochemical treatment, the quantity of the microbial growth promoter is 1-20 mg, preferably is 5-15 mg. The total concentration of active components of the microbial growth promoter refers to the total concentration of metal salt ions, polyamine substance and organic acid hydroxylamine, wherein, the metal salt is composed of one or more of calcium salt, copper salt, magnesium salt and ferrous salt.

Owing to the fact that the salt content in the concentrated water produced in high pressure reverse osmosis treatment is relatively high, the specific salt-tolerant microbial inoculum and microbial growth promoter described above are required to work together to remove the organic contaminants in the high-salinity waste water better, so as to attain a better effect in the biochemical treatment.

In the present invention, for example, the membrane bioreactor may be a biological aerated filter (BAF), membrane bioreactor (MBR), or moving bed membrane bioreactor (MBBR), etc., preferably is a BAF. The operating conditions of the membrane bioreactor preferably are: temperature: 20-40° C., pH: 7-9, and dissolved oxygen concentration: 0.5-1.5 mg/L. Preferably, the conditions of the biochemical treatment further include: activated sludge inoculum concentration: 3,000-5,000 mg/L, and hydraulic retention time: 3-12 h.

To further improve the biodegradability of the organic contaminants in the brine waste water and improve the service life of the follow-up electrodialysis membrane, in the present invention, preferably the second concentrated water produced in the high pressure reverse osmosis is treated by advanced oxidization treatment before the biochemical treatment, wherein, preferably the advanced oxidation treatment is mainly Fenton oxidation.

The Fenton oxidation is carried out in a Fenton reaction tank, a chemical dosing device is provided at the inlet to the Fenton reaction tank to add either of hydrochloric acid and sulfuric acid to adjust the pH of the concentrated water obtained through high pressure reverse osmosis membrane treatment to 2-4; ferrous salt and hydrogen peroxide are added at different concentrations, depending on the concentration of COD in the water, and the ferrous salt and the hydrogen peroxide may be added into the waste water in sequence or at the same time, but must be added into the waste water separately from each other; in other words, the ferrous salt and the hydrogen peroxide shall not be mixed before they are added into the waste water. The total reaction time is 1-4 h. Through Fenton oxidation, the COD of the waste water is decreased by 20% or more, and the B/C ($BOD_5$/COD) value is increased by 50% or more; thus, the biodegradability of the waste water is greatly improved. Here, both the COD reduction ratio and B/C improvement ratio of the waste water are in relation to the values before the Fenton oxidation after the high pressure reverse osmosis treatment. The waste water is treated by electrodialysis treatment after the biochemical treatment. In view that the third diluted water after the electrodialysis treatment is returned to the high pressure reverse osmosis treatment procedure, the requirement for the electrodialysis treatment may be lowered to protect the electrodialysis membrane and prolong the service life of the electrodialysis membrane; specifically, the electrodialysis treatment doesn't have to achieve the normal criteria for reuse, as long as the TDS in the third diluted water produced in the electrodialysis treatment is 25,000 mg/L or lower and usually is 10,000 mg/L or above, preferably is 15,000 mg/L or above. Further preferably, the ammonia nitrogen content in the third diluted water produced in the electrodialysis treatment is 5 mg/L or lower, more preferably is 4-5 mg/L or lower, e.g., 4, 4.1, 4.2, 4.5, 4.6, 4.8, or 5 mg/L. The TDS in the third concentrated water produced in the electrodialysis treatment will be 200,000 mg/L or higher, and usually the ammonia nitrogen content is 50 mg/L or lower.

The specific conditions of the electrodialysis treatment include: operating voltage: 20-60V, preferably 40V.

To further improve the effect of electrodialysis treatment and improve the service life of the electrodialysis membrane, the water outputted from the biochemical treatment unit is pretreated by softening, coagulation and sedimentation, rough filtration and ultrafiltration before the electrodialysis treatment. The operation of the softening, coagulation and sedimentation, rough filtration and ultrafiltration may be the same or similar to the operation in the preceding pretreatment step. The softening and flocculation and sedimentation procedures may be carried out in a high-density sedimentation tank, the rough filtration procedure may be carried out in a V-type filtering tank, and the average pore size of the ultrafiltration membrane is 1-100 nm. A chemical dosing device is provided at the front end of the high-density sedimentation tank to add a softener and a flocculant, wherein, the softener may be one or more of calcium hydroxide, sodium hydroxide and sodium carbonate. The flocculant may be PAM at 2-16 mg/L concentration. Preferably, a chemical dosing device is also provided at the outlet of the high-density sedimentation tank to add a pH adjustor, so as to adjust the pH to 6.5-7.5; besides, a non-oxidizing bactericide may also be added at the same time.

Through the above pretreatment, the indicators of the water input to electrodialysis will be controlled to: hardness: not higher than 70 mg/L, COD concentration: lower than 100 mg/L, turbidity: lower than 3 NTU, nitrate nitrogen concentration: lower than 100 mg/L, ammonia nitrogen concentration: lower than 25 mg/L. Preferably, in the waste water before the electrodialysis treatment, the COD value is 40-70 mg/L, the nitrate nitrogen concentration is 15-50 mg/L, the ammonia nitrogen content is 0.1-15 mg/L, the hardness is 30-50 mg/L, and the turbidity is lower than 1 NTU.

The third concentrated water produced in the electrodialysis is crystallized, preferably by circulating crystallization.

Preferably, the circulating crystallization is as follows: the third concentrated water produced in the electrodialysis is treated by primary evaporating crystallization to obtain sodium sulfate crystals and primary mother liquid, the primary mother liquid is treated by freezing crystallization to obtain mirabilite and secondary mother liquid, the secondary mother liquid is treated by secondary evaporating crystallization to obtain sodium chloride crystals and tertiary mother liquid, and the tertiary mother liquid may be circulated to the primary evaporating crystallization section; thus, zero release of the waste water is realized.

Furthermore, in the primary evaporating crystallization, the temperature of concentration by evaporation is 50-150° C., and the crystallization temperature is 50-100° C.; in the secondary evaporating crystallization, the temperature of concentration by evaporation is 50-150° C., and the crystallization temperature is 30-50° C.; the temperature of freezing crystallization is from −8° C. to 0° C.

Furthermore, the devices used for the evaporating crystallization include an evaporator and a crystallizer. The evaporator may be any of natural-circulation evaporator, forced circulation evaporator, rising film evaporator, and falling film evaporator; the crystallizer may be any of Oslo crystallizer, DP crystallizer, and a variant of them. The evaporator and the crystallizer are existing devices in the art or designed according to the prior art.

Furthermore, the sodium sulfate, mirabilite and sodium chloride produced in the treatment are collected by means of a centrifugal dehydrator. The purity of the sodium sulfate may be as high as 95% or above, and the product quality complies with the criteria for Grade III industrial anhydrous sodium sulfate as specified in the national standard. The purity of the sodium chloride may be as high as 98% or above, and the product quality meets the criteria for Grade II refined industrial salt as specified in the national standard. The purity of the mirabilite may be 90% or above. The purities of the products are measured in mass percent.

According to a specific embodiment of the present invention, a method for zero-release treatment of brine waste water in the coal chemical engineering industry comprises the following steps:

(1) pretreatment: the pretreatment includes softening, coagulation and sedimentation, rough filtration and ultrafiltration procedures, and the water outputted from the pretreatment process is treated by reverse osmosis treatment;

(2) reverse osmosis treatment: a membrane treatment process that combines intermediate pressure reverse osmosis and high pressure reverse osmosis and is resistant to membrane contamination is used, the water outputted from the pretreatment process is treated by intermediate pressure reverse osmosis first, the first diluted water produced through the intermediate pressure reverse osmosis is reused, the first concentrated water produced in the intermediate pressure reverse osmosis is treated together with the third diluted water produced in the electrodialysis unit by high pressure reverse osmosis then, the second diluted water produced through the high pressure reverse osmosis is reused, and the second concentrated water produced in the high pressure reverse osmosis is treated by electrodialysis concentration;

(3) advanced oxidation treatment: the second concentrated water produced in the high pressure reverse osmosis is treated by advanced oxidation treatment first, mainly by Fenton oxidization, to improve the biodegradability of the organic contaminants in the brine waste water;

(4) biochemical treatment: the water outputted from the advanced oxidation unit is fed to the biochemical treatment unit, and the COD and total nitrogen are removed by adding a salt-tolerant microbial inoculum and a microbial growth promoter into the membrane bioreactor;

(5) electrodialysis concentration: the water outputted from the biochemical treatment is pretreated by softening, coagulation and sedimentation, rough filtration and ultrafiltration treatment, and then is treated by electrodialysis to further concentrate, the third diluted water produced through the electrodialysis is circulated as water input to the high pressure reverse osmosis, and the third concentrated water produced in the high pressure reverse osmosis is treated by circulating crystallization;

(6) circulating crystallization: the third concentrated water produced in the electrodialysis is treated by primary evaporating crystallization to obtain sodium sulfate crystals and primary mother liquid, the primary mother liquid is treated by freezing crystallization to obtain mirabilite and secondary mother liquid, the secondary mother liquid is treated by secondary evaporating crystallization to obtain sodium chloride crystals and tertiary mother liquid, and the tertiary mother liquid is circulated to the primary evaporating crystallization section; thus, zero release of the waste water is realized.

Preferably, in the step (1), the softening, flocculation and sedimentation procedures is carried out in a high-density sedimentation tank, the rough filtration procedure is carried out in a V-type filtering tank, and the average pore size of the ultrafiltration membrane is 1-100 nm.

Preferably, in the step (1), a chemical dosing device is provided at the front end of the high-density sedimentation tank to add a softener and a flocculant; a chemical dosing device is also provided at the outlet of the high-density sedimentation tank to add either of hydrochloric acid and sulfuric acid to adjust the pH to 6.5-7.5 and add a non-oxidizing bactericide respectively.

Preferably, in the step (1), the softener is one or more of calcium hydroxide, sodium hydroxide and sodium carbonate; the coagulant is a composite coagulant consisting of polyferric sulfate and polyacrylamide, wherein, the concentration of the polyferric sulfate is 5-200 mg/L, and the concentration of the polyacrylamide is 0.5-12 mg/L.

Preferably, in the step (1), after the pretreatment procedure, the indicators of the waste water are controlled to: hardness: lower than 200 mg/L, COD: lower than 70 mg/L, turbidity: lower than 3 NTU. Preferably, in the step (2), the operating pressure of the intermediate pressure reverse osmosis membrane is 1-3 MPa, and the operating pressure of the high pressure reverse osmosis membrane is 3-6 MPa.

Preferably, in the step (2), after a two-stage reverse osmosis separation process, the TDS in the concentrated water produced in the high pressure reverse osmosis is 50,000 mg/L or higher.

Preferably, in the step (4), the salt-tolerant microbial inoculum added to the biochemical treatment is the salt-tolerant microbial inoculum described in the patent document CN201210130645.8 or CN201210130644.3, and the dose of the salt-tolerant microbial inoculum is 0.01-0.1% of the volume of the treated waste water per hour.

Preferably, in the step (4), the mix ratio of active components in the microbial growth promoter added to the biochemical treatment is as follows: metal salt: 40-100 pbw, preferably 50-80 pbw, polyamine substance: 5-30 pbw, preferably 10-20 pbw, organic acid hydroxylamine: 0.5-15 pbw, preferably 2-10 pbw; the metal salt is composed of calcium salt, copper salt, magnesium salt and/or ferrous salt.

Preferably, in the step (4), the microbial growth promoter added to the biochemical treatment is dosed so that the total concentration of active components of the promoter in the waste water treatment system is 1-20 mg/L, preferably is 5-15 mg/L.

Preferably, in the step (5), the softening, flocculation and sedimentation procedures is carried out in a high-density sedimentation tank, the rough filtration procedure is carried out in a V-type filtering tank, and the average pore size of the ultrafiltration membrane is 1-100 nm.

Preferably, in the step (5), the indicators of the water input to electrodialysis are controlled to: hardness: lower than 50 mg/L, COD: lower than 70 mg/L, turbidity: lower than 3 NTU.

Preferably, in the step (5), after electrodialysis concentration, the TDS in the concentrated water is 200,000 mg/L or above; the TDS in the fresh water produced in electrodialysis is 25,000 mg/L or lower.

Through the above-mentioned crystallization process, zero release in the waste water treatment can be realized essentially.

The present invention further provides a brine waste water treatment system, comprising a first pretreatment unit, a reverse osmosis treatment unit, a biochemical treatment unit, a second pretreatment unit, an electrodialysis unit, and a crystallization unit, wherein, the reverse osmosis treatment unit comprises an intermediate pressure reverse osmosis treatment membrane device and a high pressure reverse osmosis treatment membrane device, an water outlet of the first pretreatment unit is connected with a water inlet of the intermediate pressure reverse osmosis treatment membrane device, a first concentrated water outlet of the intermediate pressure reverse osmosis treatment membrane device is connected with a water inlet of the high pressure reverse osmosis treatment membrane device, a second concentrated water outlet of the high pressure reverse osmosis treatment membrane device is connected with the biochemical treatment unit, a water outlet of the biochemical treatment unit is connected with a water inlet of the second pretreatment unit, a water outlet of the second pretreatment unit is connected with the electrodialysis unit, a fresh water outlet of the electrodialysis unit is connected with a water inlet of the high pressure reverse osmosis treatment membrane device, a third concentrated water outlet of the electrodialysis unit is connected with an water inlet of the crystallization unit.

The water produced in the intermediate pressure reverse osmosis treatment membrane device is discharged via a water outlet or is reused, and the concentrated water outlet is connected with the water inlet of the high pressure reverse osmosis membrane treatment device, so that the concentrated water produced in the intermediate pressure reverse osmosis treatment membrane device is subject to reverse osmosis treatment again at a higher pressure.

In the present invention, the intermediate pressure reverse osmosis treatment membrane device is directly connected with the high pressure reverse osmosis treatment membrane device, without any other treatment device between them.

According to an embodiment of the present invention, the high pressure reverse osmosis treatment membrane device is directly connected with the biochemical treatment unit, without any other treatment device between them.

Preferably, the first pretreatment unit and the second pretreatment unit comprise a conditioning tank, a high-density sedimentation tank, a V-type filtering tank, and an ultrafiltration device respectively, which are connected with each other in sequence according to the flow direction of the brine waste water.

Preferably, a Fenton reaction tank is provided between the high pressure reverse osmosis treatment membrane device and the biochemical treatment unit to enable the concentrated water produced in the high pressure reverse osmosis treatment membrane device to have a Fenton reaction before the biochemical treatment.

According to an embodiment of the present invention, the high pressure reverse osmosis treatment membrane device is directly connected with the Fenton reaction tank, and the Fenton reaction tank is directly connected with the biochemical treatment unit, without any other treatment device between them.

Preferably, the biochemical treatment unit is provided with a feed inlet for salt-tolerant microbial inoculum and/or microbial growth promoter.

In the present invention, the biochemical treatment is arranged after the high pressure reverse osmosis treatment and before the electrodialysis.

Preferably, the crystallization unit comprises a primary evaporating crystallizer, a freezing crystallizer, and a secondary evaporating crystallizer, the concentrated water produced in the electrodialysis unit is supplied to the primary evaporating crystallizer, the mother liquid produced in the primary evaporating crystallizer is fed to the freezing crystallizer, and the mother liquid produced in the freezing crystallizer is fed to the secondary evaporating crystallizer.

In the present invention, two-stage reverse osmosis membrane treatment including intermediate pressure reverse osmosis membrane treatment and high pressure reverse osmosis membrane treatment is used, biochemical treatment is added between the high pressure reverse osmosis and the electrodialysis, and the fresh water outlet of the electrodialysis unit is connected with the water inlet of the high pressure reverse osmosis membrane treatment device, so that the fresh water produced in the electrodialysis unit is treated by high pressure reverse osmosis membrane treatment together with the concentrated water from the intermediate pressure reverse osmosis membrane treatment device. Thus, the requirement for treatment with the electrodialysis device can be decreased. The water produced in the electrodialysis device still has relatively high salt content, and the electrodialysis device is used in combination with the reverse osmosis unit; thus, both the reverse osmosis unit and the electrodialysis unit can operate stably for a long period.

Preferably, the crystallization unit comprises a primary evaporating crystallizer, a freezing crystallizer, and a secondary evaporating crystallizer, the concentrated water produced in the electrodialysis unit is supplied to the primary evaporating crystallizer, the mother liquid produced in the primary evaporating crystallizer is fed to the freezing crystallizer, and the mother liquid produced in the freezing crystallizer is fed to the secondary evaporating crystallizer.

The treatment method and system provided in the present invention are applicable to treatment of a variety of brine waste water, in which the salt may be one or more of sodium sulfate, sodium chloride and sodium nitrate. The waste water may come from a coal chemical works or any other industrial installation.

Hereunder the entire process of zero release treatment of brine waste water provided in the present invention will be further detailed in embodiments with reference to FIG. 1, but the protection scope of the present invention is not limited to those embodiments. Unless otherwise specified, all the units are conventional devices or apparatuses in the art. As shown in FIG. 1, firstly, the brine waste water is fed into a conditioning tank 1 for homogenization, into a sedimentation tank 2 in the presence of a softener and a flocculant for flocculation and sedimentation, into a filtering tank 3 and into an ultrafiltration device 4 for ultrafiltration; the filtrate is fed to an intermediate pressure reverse osmosis membrane device 5, the water produced in the ultrafiltration is sent to a recycled water tank 16 for reuse, and the first concentrated water is fed to a high pressure reverse osmosis membrane device 6; the diluted water produced in the high pressure reverse osmosis membrane device 6 is sent to the recycled water tank 16 for reuse, the second concentrated water is fed to an advanced oxidation device 7 (e.g., a Fenton reaction tank) for oxidation, and then the oxidized concentrated water is fed to a biochemical treatment unit 8 for biochemical treatment to decrease COD and nitrogen content; after the biochemical treatment, the waste water is fed to the high-density sedimentation tank 9 for flocculation and sedimentation in the presence of the softener and the flocculant, then the treated waste water is fed to the V-type filtering tank 10 for filtering, and then fed to the ultrafiltration device 11 for ultrafiltration; the filtrate is fed to the electrodialysis membrane device 12 for electrodialysis treatment, the third diluted water produced in the electrodialysis treatment is returned to the high pressure reverse osmosis membrane device 6 for high pressure reverse osmosis treatment, and the concentrated water is crystallized in the sequence of in primary vaporizing crystallization device 13, freezing crystallization device 14 and secondary evaporating crystallization device 15. In the crystallization process, the third concentrated water produced in the electrodialysis is treated by primary evaporating crystallization to obtain sodium sulfate crystals and primary mother liquid, the primary mother liquid is treated by freezing crystallization to obtain mirabilite and secondary mother liquid, the secondary mother liquid is treated by secondary evaporating crystallization to obtain sodium chloride crystals and tertiary mother liquid, and the tertiary mother liquid is circulated to the primary evaporating crystallization section; or, when the accumulated COD of the mother liquid is too high (e.g., about 10,000 mg/L), the mother liquid may be circulated to the Fenton reaction tank or treated with other methods. Thus, zero release of the waste water is realized. Preferably, homogenization and sedimentation can be performed in a high-density sedimentation tank which has reaction area and sedimentation area. Filtering can be performed in a V-type filtering tank.

Hereunder the present invention will be further detailed in examples. In the following examples and comparative examples, the $BOD_5$ is measured with a Standard dilution $BoD_5$; the COD is measured with the method specified in GB11914-89 "Water Quality—Determination of Chemical Oxygen Demand—Dichromate Method"; the TDS is directly measured with a conductivity meter; the turbidity is measured with the method specified in the international standard ISO7027-1984 "Water Quality—Determination of Turbidity"; the alkalinity is measured with the method specified in GB9736-2008 "Chemical Reagent—General Method for Determination of Acidity and Alkalinity"; the hardness is measured with the method specified in GB7477-87 "Water Quality—Determination of the Sum of Calcium and Magnesium—EDTA Titrimetric Method"; the concentration of nitrate nitrogen is measured with the method specified in GB7480-87 "Water Quality—Determination of Nitrate Nitrogen—Spectrophotometric Method with Phenol Disulfonic Acid"; the ammonia nitrogen concentration is measured with the method specified in GB7478-87 "Water Quality—Determination of Ammonium—Distillation and Titration Method"; the total nitrogen concentration is measured with the method specified in GB11894-89 "Water Quality—Determination of Total Nitrogen—UV Spectrophotometric Method—Alkaline Potassium Persulfate Digestion Method". The cost of waste water treatment is calculated based on the investment and operation cost, usually including energy consumption, depreciation of equipment (including replacement of membranes), and labor cost, etc. The service life of the membrane is judged according to the water production rate; namely, the service life of the membrane is deemed as reaching its end if the water production rate of the membrane doesn't meet the production requirement. The water production rate=quantity of diluted water from membrane/quantity of inputted water×100% Unless otherwise specified, all the devices and apparatuses are commercially available ones, and the devices and apparatuses used in the examples are the same as those used in the comparative examples.

The microbial growth promoter is prepared according to the proportion and formulation shown in Table 1.

TABLE 1

Formulation and Component Proportion of the Microbial Growth Promoter

| Promoter | Metal Salt Composition | Molar Ratio of Ions | Part by Weight | Polyamine Substance Name | Part by Weight | Organic Acid Hydroxylamine Name | Part by Weight |
|---|---|---|---|---|---|---|---|
| I-A | $CaSO_4$, $FeSO_4$, $CuSO_4$ | 8:2:1 | 49 | Spermine | 10 | Hydroxylamine formate | 5 |
| I-B | $CaCl_2$, $MgCl_2$, $FeCl_2$, $CuCl_2$ | 10:20:3:3 | 61 | Spermidine | 12 | Hydroxylamine acetate | 8 |

The salt-tolerant microbial inoculum is prepared according to the mix ratio shown in Table 2, and all the bacteria involved in the salt-tolerant microbial inoculum have been fully disclosed in the patent documents CN201210130645.8 and CN201210130644.3; wherein, the mix ratio is calculated in volume of bacterium.

TABLE 2

Composition and Mix Ratio of Different Microbial Inocula

| Microbial Inoculum | Composition of Inoculum | Mix Ratio |
|---|---|---|
| II-A | FSDN-A:SDN-3:DN-3:FDN-1:FDN-2 | 1:0.5:0.5:0.5:0.5 |
| II-B | FSDN-C:SDN-3:DN-3:FDN-1:FDN-2 | 1:0.5:0.5:0.5:0.5 |
| II-C | FSDN-C:SDN-3:DN-3:FSDN-A | 1:0.5:0.5:0.5 |
| II-D | FSDN-C:SDN-3:FSDN-A | 1:0.5:0.5 |
| II-E | FSDN-C:SDN-3:FSDN-A | 1:1:0.3 |
| II-F | FSDN-C:SDN-3 | 1:1 |
| II-G | FSON-1:SDN-3:DN-3 | 1:0.5:0.5 |

Example 1

The concentrations of the contaminants in the brine waste water in coal chemical engineering are: COD: 80 mg/L, total hardness (measured in $CaCO_3$): 1,500 mg/L, total alkalinity (measured in $CaCO_3$): 800 mg/L, silicon dioxide: 30 mg/L, TDS: 5,000 mg/L, nitrate nitrogen: 40 mg/L, ammonia nitrogen: 25 mg/L, $Cl^-$: 700 mg/L, $SO_4^{2-}$: 1,000 mg/L, and pH is 8. The brine waste water is treated through the process shown in FIG. 1. Specifically, the following steps are used:

(1) The brine waste water is fed into a high-density sedimentation tank 1, calcium hydroxide is added at a ratio of 1.8 g/L into the reaction area in the high-density sedimentation tank 1 according to the quality of the brine waste water to maintain the pH at 10.5-11.0, then sodium carbonate is added at a ratio of 2.0 g/L, PFS coagulant is added at a ratio of 10 mg/L, and PAM coagulant aid is added at a ratio of 1 mg/L; after the brine waste water is coagulated fully in the reaction area, the product is moved to a sedimentation area of the high-density sedimentation tank 1 for sedimentation; finally, hydrochloric acid is added at the outlet of the high-density sedimentation tank 1 to adjust the pH to about 7, and a non-oxidizing bactericide (product SMSJ-01D commercialized from SAMMEI company in Guangdong, China) is added to prevent contamination of the membranes. After the treatment, the hardness of the water outputted from the high-density sedimentation tank 1 is 190 mg/L, lower than 200 mg/L.

(2) The water outputted from the high-density sedimentation tank 1 is filtered in a V-type filtering tank 2 to remove suspended matters and colloidal solids, etc. in the water; finally, the turbidity in the waste water is controlled at about 3 NTU, the COD is controlled at about 50 mg/L, and the water is fed to an ultrafiltration device 3 for ultrafiltration. The operating pressure of the ultrafiltration device 3 is 0.05 MPa; after further treatment by ultrafiltration, the waste water outputted has: hardness: 190 mg/L, lower than 200 mg/L, COD: 45 mg/L, lower than 50 mg/L, nitrate nitrogen: 40 mg/L, turbidity: lower than or equal to 1 NTU.

(3) The pretreated waste water is fed into a reverse osmosis unit for concentration. The reverse osmosis unit includes intermediate pressure reverse osmosis 4 and high pressure reverse osmosis 5, and is provided with a 25 μm microporous filter as a safeguard for quality of water input. The intermediate pressure reverse osmosis unit 4 employs a contamination-resistant intermediate pressure reverse osmosis membrane, which operates at about 2 MPa operating pressure; the first concentrated water produced in the intermediate pressure reverse osmosis 4 is fed together with the third diluted water produced in the electrodialysis unit to the high pressure reverse osmosis unit, which operates at about 3.5 MPa; in the diluted water produced after intermediate pressure reverse osmosis and high pressure reverse osmosis, the COD is 30 mg/L, the TDS is 290 mg/L, lower than 300 mg/L, the hardness is lower than or equal to 10 mg/L; namely, the diluted water meets the requirement for quality of replenishing water for circulating water. The service life of the reverse osmosis membrane assembly is 3 years or longer. The TDS in the second concentrated water produced in reverse osmosis is as high as 50,000 mg/L, the COD is 530 mg/L, the B/C value is lower than 0.1, the nitrate nitrogen concentration is 380 mg/L, and the ammonia nitrogen concentration is 210 mg/L.

(4) The second concentrated water produced in high pressure reverse osmosis is fed to a Fenton reaction tank, hydrochloric acid is added at the inlet of the Fenton reaction tank to adjust the pH to about 3, and hydrogen peroxide and ferrous ions (ferrous chloride) are added at a mass ratio of 20:1 in sequence in the Fenton reaction tank, and the mass ratio of hydrogen peroxide to COD is controlled at 2:1, the reaction time is 2 h. After Fenton oxidation, the COD is 500 mg/L, the B/C value is higher than 0.4, the nitrate nitrogen concentration is 380 mg/L, and the ammonia nitrogen concentration is 200 mg/L.

(5) The water outputted from the Fenton reaction tank is fed into a biological aerated filter to remove COD and nitrate radicals. Activated sludge at 4,000 mg/L sludge concentration is inoculated in advance in the biological aerated filter for initiation. The operating conditions are: temperature: 27° C., pH: 7.5, dissolved oxygen concentration: 1.0 mg/L, hydraulic retention time: 6 h. The salt-tolerant microbial inoculum II-A is added at a ratio of 0.1 vol % of waste water treated per hour in the biological aerated filter, and the microbial growth promoter I-A is added so that the total concentration of active components of the promoter in the sewage treatment system is 15 mg/L. After the treatment in the biological aerated filter, the COD in the outputted water is 150 mg/L, lower than 200 mg/L, the nitrate nitrogen concentration is 38 mg/L, lower than 100 mg/L, and the ammonia nitrogen concentration is 15 mg/L.

(6) The water outputted from the biochemical treatment unit is fed into a high-density sedimentation tank, sodium hydroxide is added into the reaction area in the high-density sedimentation tank according to the water quality to maintain the pH at about 11.5, then sodium carbonate is added at a ratio of 2.2 g/L, PFS coagulant is added at a ratio of 50 mg/L, and PAM coagulant aid is added at a ratio of 5 mg/L; after coagulated fully in the reaction area, the water is moved to a sedimentation area of the high-density sedimentation tank for sedimentation; finally, sulfuric acid is added at the outlet of the high-density sedimentation tank to adjust the pH to about 7, and a non-oxidizing bactericide (product SMSJ-01D commercialized from SAMMEI company in Guangdong, China) is added to prevent contamination of the membrane. After the treatment, the hardness of the water outputted from the high-density sedimentation tank is 49 mg/L, lower than 50 mg/L.

(7) The water outputted from the high-density sedimentation tank is filtered in a V-type filtering tank to remove suspended matters and colloidal solids, etc. in the water; finally, the turbidity in the waste water is controlled at about 3 NTU, and the water is fed to an ultrafiltration device for ultrafiltration. The operating pressure of the ultrafiltration device is 0.05 MPa; after further treatment by ultrafiltration, the waste water outputted has: hardness: 45 mg/L, lower than 50 mg/L, COD: 65 mg/L, lower than 70 mg/L, turbidity: 0.8 NTU, lower than 1 NTU, and ammonia nitrogen concentration: 15 mg/L.

(8) The waste water is fed into an electrodialysis device for further concentration, the electrodialysis device operates at 40V voltage, the TDS in the diluted water is controlled at about 15,000 mg/L and the ammonia nitrogen concentration is controlled at 4.5 mg/L, by controlling the water production efficiency. The diluted water is returned to the high pressure reverse osmosis membrane unit and is treated by high pressure reverse osmosis treatment together with the concentrated water produced in the intermediate pressure reverse osmosis treatment; the TDS in the concentrated water is as high as 200,000 mg/L or above, and the concentrated water is fed to an evaporating crystallization unit.

(9) In the primary evaporating crystallization device, sodium sulfate that complies with the criteria for quality of Grade III industrial anhydrous sodium sulfate as specified in the national standard is obtained at 100° C. evaporation temperature and 50-80° C. crystallization temperature; the remaining mother liquid after crystallization is fed to a freezing crystallization device, and mirabilite at 90% or higher purity is further obtained at about −5° C. crystallization temperature; the remaining liquid is returned to the secondary evaporating crystallization device, and sodium chloride that complies with the quality criteria for Grade II refined industrial salt as specified in the national standard is obtained at 100° C. evaporation temperature and 30-50° C. crystallization temperature; the TDS in the remaining mother liquid after secondary evaporating crystallization is controlled to be 400,000 mg/L or higher, and the mother liquid is recirculated to the primary evaporating crystallization device to further treat the remaining salt content in the mother liquid by evaporating crystallization. Three crystallized products with acceptable purity are obtained through a cyclic process by controlling the conditions, and the recovery efficiency of water and salts is improved. The recirculated mother liquid is circulated to the Fenton reaction tank for treatment, when the accumulated COD in the mother liquid is too high (e.g., about 10,000 mg/L).

By the above process, the cost of waste water treatment is RMB18 per ton brine waste water, which is much lower than the cost of waste water treatment (RMB28 per ton brine waste water) in the prior art. In addition, the service life of the intermediate pressure reverse osmosis membrane and the high pressure reverse osmosis membrane is up to 5 years, and the service life of the electrodialysis membrane is up to 5 years. Thus, the operating period of the device can extended to be 5 years, which is significantly higher than the operating period (1.5 years) in the prior art.

Example 2

Waste water from the same source as the waste water in the Example 1 is treated through the process shown in FIG. 1. Specifically, the following steps are used:

(1) The brine waste water is fed into a high-density sedimentation tank, calcium hydroxide is added at a ratio of 1.8 g/L into the reaction area in the high-density sedimentation tank according to the quality of the brine waste water to maintain the pH at 11.0-11.5, then sodium carbonate is added at a ratio of 2.5 g/L, PFS coagulant is added at a ratio of 50 mg/L, and PAM coagulant aid is added at a ratio of 5 mg/L; after the brine waste water is coagulated fully in the reaction area, the product is moved to a sedimentation area of the high-density sedimentation tank for sedimentation; finally, sulfuric acid is added at the outlet of the high-density sedimentation tank to adjust the pH to about 7, and a non-oxidizing bactericide (product SMSJ-01D commercialized from SAMMEI company in Guangdong, China) is added to prevent contamination of the membrane. After the treatment, the hardness of the water outputted from the high-density sedimentation tank is 195 mg/L.

(2) The water outputted from the high-density sedimentation tank is filtered in a V-type filtering tank to remove suspended matters and colloidal solids, etc. in the water; finally, the turbidity in the waste water is controlled at about 3 NTU, the COD is controlled at about 50 mg/L, and the water is fed to an ultrafiltration device for ultrafiltration. The operating pressure of the ultrafiltration device is 0.05 MPa; after further treatment by ultrafiltration, finally the waste water has: hardness: 190 mg/L, lower than 200 mg/L, COD: 48 mg/L, lower than 50 mg/L, nitrate nitrogen concentration: 40 mg/L, turbidity: 0.9 NTU, lower than 1 NTU, ammonia nitrogen concentration: 25 mg/L.

(3) The pretreated waste water is fed into a reverse osmosis unit for concentration. The reverse osmosis unit includes intermediate pressure reverse osmosis and high pressure reverse osmosis, and is provided with a 25 μm microporous filter as a safeguard for quality of water input. The intermediate pressure reverse osmosis unit employs a contamination-resistant intermediate pressure reverse osmosis membrane, which operates at about 1.5 MPa operating pressure; the concentrated water produced in the intermediate pressure reverse osmosis is fed together with the fresh water produced in the electrodialysis unit to the high pressure reverse osmosis unit, which operates at about 4.0 MPa; in the fresh water produced in intermediate pressure reverse osmosis and high pressure reverse osmosis, the COD concentration is 28 mg/L, lower than 30 mg/L, the TDS is 290 mg/L, lower than 300 mg/L, the hardness is lower than or equal to 10 mg/L; namely, the fresh water meets the requirement for quality of reused water. The service life of the reverse osmosis membrane assembly is up to 4 years. The TDS in the concentrated water produced in reverse osmosis is as high as 50,000 mg/L, the COD is 530 mg/L, the nitrate nitrogen concentration is 380 mg/L, the ammonia nitrogen concentration is 210 mg/L, and the B/C value is lower than 0.1.

(4) The concentrated water produced in high pressure reverse osmosis is fed to a Fenton reaction tank, hydrochloric acid or sulfuric acid is added at the inlet of the Fenton reaction tank to adjust the pH to about 3, and hydrogen peroxide and ferrous ions (ferrous sulfate) are added at a mass ratio of 10:1 in sequence in the Fenton reaction tank, and the mass ratio of hydrogen peroxide to COD is controlled at 2:1, the reaction time is 1.5 h. After Fenton oxidation, the COD is 500 mg/L, the nitrate nitrogen concentration is 380 mg/L, the ammonia nitrogen concentration is 200 mg/L, and the B/C value is higher than 0.3.

(5) The water outputted from the Fenton reaction tank is fed into a biological aerated filter to remove COD and nitrate radicals. Activated sludge at 4,000 mg/L sludge concentration is inoculated in advance in the biological aerated filter for initiation. The operating conditions are: temperature: 27° C., pH: 7.5, dissolved oxygen concentration: 1.0 mg/L, hydraulic retention time: 8 h. The salt-tolerant microbial inoculum II-B is added at a ratio of 0.1 vol % of waste water treated per hour in the biological aerated filter, and the microbial growth promoter I-B is added so that the total concentration of active components of the promoter in the sewage treatment system is 15 mg/L. After the treatment in the biological aerated filter, the COD in the outputted water is 150 mg/L, lower than 200 mg/L, the nitrate nitrogen concentration is 38 mg/L, lower than 100 mg/L, and the ammonia nitrogen concentration is 15 mg/L.

(6) The water outputted from the biochemical treatment unit is fed into a high-density sedimentation tank, sodium hydroxide is added into the reaction area in the high-density sedimentation tank according to the water quality to maintain the pH at about 11.5, then sodium carbonate is added at a ratio of 2.5 g/L, PFS coagulant is added at a ratio of 50 mg/L, and PAM coagulant aid is added at a ratio of 5 mg/L; after the brine waste water is coagulated fully in the reaction area, the product is moved to a sedimentation area of the high-density sedimentation tank for sedimentation; finally, hydrochloric acid is added at the outlet of the high-density sedimentation tank to adjust the pH to about 7, and a non-oxidizing bactericide (product SMSJ-01D commercialized from SAMMEI company in Guangdong, China) is added to prevent contamination of the membrane. After the treatment, the hardness of the water outputted from the high-density sedimentation tank is 50 mg/L.

(7) The water outputted from the high-density sedimentation tank is filtered in a V-type filtering tank to remove suspended matters and colloidal solids, etc. in the water; finally, the turbidity in the waste water is controlled at about 3 NTU, and the water is fed to an ultrafiltration device for ultrafiltration. The ultrafiltration device operates at 0.05 MPa; after further treatment by ultrafiltration, the waste water has: hardness: 48 mg/L, COD: 50 mg/L, turbidity 0.8 NTU, and ammonia nitrogen concentration: 15 mg/L.

(8) The waste water is fed to an electrodialysis device for further concentration, and the electrodialysis device operates at 40V operating voltage; to ensure stable operation of electrodialysis for a long period, the TDS in the produced water (fresh water) is determined to be about 20,000 mg/L, the ammonia nitrogen concentration is 4 mg/L; then, the water is fed to a high pressure reverse osmosis membrane unit for further desalting treatment; the TDS in the concentrated water is as high as 200,000 mg/L or above, and the concentrated water is fed to an evaporating crystallization unit. The water produced in the electrodialysis device is controlled to have relatively high salt content still, and the electrodialysis device is used in combination with the reverse osmosis unit; thus, both the reverse osmosis unit and the electrodialysis unit can operate stably for a long period.

(9) In the primary evaporating crystallization device 13, sodium sulfate that complies with the criteria for quality of Grade III industrial anhydrous sodium sulfate as specified in the national standard is obtained at 110° C. evaporation temperature and 80-100° C. crystallization temperature; the remaining mother liquid after crystallization is fed to a freezing crystallization device 14, and mirabilite at 92% or higher purity is further obtained at about −5° C. crystallization temperature; the remaining liquid is returned to the secondary evaporating crystallization device 15, and sodium chloride that complies with the quality criteria for Grade II refined industrial salt as specified in the national standard is obtained at 100° C. evaporation temperature and 30-50° C.

crystallization temperature; the TDS in the remaining mother liquid after secondary evaporating crystallization is controlled to be 400,000 mg/L or higher, and the mother liquid is recirculated to the primary evaporating crystallization device to further treat the remaining salt content in the mother liquid by evaporating crystallization. Three crystallized products with acceptable purity are obtained through a cyclic process by controlling the conditions, and the recovery efficiency of water and salts is improved. The recirculated mother liquid is circulated to the Fenton reaction tank for treatment, when the accumulated COD in the mother liquid is too high (e.g., about 10,000 mg/L).

By the above process, the cost of the waste water treatment is RMB20 yuan per ton brine waste water, the service life of the intermediate pressure reverse osmosis membrane and the high pressure reverse osmosis membrane is up to 4 years, and the service life of the electrodialysis membrane is up to 4 years. Thus, the operating period of the device can be 4 years.

Example 3

The concentrations of the contaminants in the brine waste water produced in an oil refinery are: COD: 100 mg/L, total hardness (measured in $CaCO_3$): 2,500 mg/L, total alkalinity (measured in $CaCO_3$): 1,800 mg/L, silicon dioxide: 10 mg/L, TDS: 6,000 mg/L, nitrate nitrogen concentration is 60 mg/L, ammonia nitrogen concentration is 35 mg/L, chloride ion concentration is 500 mg/L, sulfate ion concentration is 1,500 mg/L, and pH is 8.5. The waste water treatment is carried out through the process shown in FIG. 1. Specifically, the following steps are used:

(1) The brine waste water is fed into a conditioning tank, calcium hydroxide is added at a ratio of 2.8 g/L into the reaction area in the conditioning tank according to the quality of the brine waste water to maintain the pH at 10.5-11.0, then sodium carbonate is added at a ratio of 3.0 g/L, PFS coagulant is added at a ratio of 20 mg/L, and PAM coagulant aid is added at a ratio of 2 mg/L; after the brine waste water is coagulated fully in the reaction area, the product is moved to a sedimentation area of the high-density sedimentation tank for sedimentation; finally, hydrochloric acid is added at the outlet of the high-density sedimentation tank to adjust the pH to about 7, and a non-oxidizing bactericide (product SMSJ-01D commercialized from SAMMEI company in Guangdong, China) is added to prevent contamination of the membrane. After the treatment, the hardness of the water outputted from the high-density sedimentation tank is 180 mg/L.

(2) The water outputted from the high-density sedimentation tank is filtered in a V-type filtering tank 2 to remove suspended matters and colloidal solids, etc. in the water; finally, the turbidity in the waste water is controlled at about 5 NTU, the COD is controlled at about 80 mg/L, and the water is fed to an ultrafiltration device for ultrafiltration. The operating pressure of the ultrafiltration device is 0.08 MPa; after further treatment by ultrafiltration, finally the waste water has: hardness: 200 mg/L, COD: 50 mg/L, nitrate nitrogen concentration: 60 mg/L, turbidity: 1.0 NTU, ammonia nitrogen concentration: 35 mg/L.

(3) The pretreated waste water is fed into a reverse osmosis unit for concentration. The reverse osmosis unit includes intermediate pressure reverse osmosis and high pressure reverse osmosis, and is provided with a 25 μm microporous filter as a safeguard for quality of water input. The intermediate pressure reverse osmosis unit employs a contamination-resistant intermediate pressure reverse osmosis membrane, which operates at about 1 MPa operating pressure; the concentrated water produced in the intermediate pressure reverse osmosis is fed together with the fresh water produced in the electrodialysis unit to the high pressure reverse osmosis unit, which operates at about 5 MPa operating pressure; in the fresh water produced in intermediate pressure reverse osmosis and high pressure reverse osmosis, the COD concentration is lower than 30 mg/L, the TDS is lower than 300 mg/L, the hardness is lower than 10 mg/L; namely, the fresh water meets the requirement for quality of replenishing water for circulating water. The service life of the reverse osmosis membrane assembly is 3 years or longer. The TDS in the concentrated water produced in reverse osmosis is as high as 60,000 mg/L, wherein, the COD concentration is 640 mg/L, the nitrate nitrogen concentration is 400 mg/L, the ammonia nitrogen concentration is 280 mg/L, and the B/C value is lower than 0.1.

(4) The concentrated water produced in high pressure reverse osmosis is fed to a Fenton reaction tank, hydrochloric acid is added at the inlet of the Fenton reaction tank to adjust the pH to about 3, and hydrogen peroxide and ferrous ions (ferrous chloride) are added at a mass ratio of 20:1 in sequence in the Fenton reaction tank, and the mass ratio of hydrogen peroxide to COD is controlled at 2:1, the reaction time is 2 h. After Fenton oxidation, the COD in the water is 500 mg/L, the B/C value is higher than 0.4, the nitrate nitrogen concentration is 380 mg/L, and the ammonia nitrogen concentration is 200 mg/L.

(5) The water outputted from the Fenton reaction tank is fed into a biological aerated filter to remove COD and nitrate radicals. Activated sludge at 5,000 mg/L sludge concentration is inoculated in advance in the biological aerated filter for initiation. The operating conditions are: temperature: 20° C., pH: 7.5, dissolved oxygen concentration: 1.0 mg/L, hydraulic retention time: 6 h. The salt-tolerant microbial inoculum II-C is added at a ratio of 0.05 vol % of waste water treated per hour in the biological aerated filter, and the microbial growth promoter I-A is added so that the total concentration of active components of the promoter in the sewage treatment system is 15 mg/L. After the treatment in the biological aerated filter, the COD in the outputted water is 150 mg/L, the nitrate nitrogen concentration is 38 mg/L, and the ammonia nitrogen concentration is 15 mg/L.

(6) The water outputted from the biochemical treatment unit is fed into a high-density sedimentation tank, sodium hydroxide is added into the reaction area in the high-density sedimentation tank according to the water quality to maintain the pH at about 11.5, then sodium carbonate is added at a ratio of 3.2 g/L, PFS coagulant is added at a ratio of 100 mg/L, and PAM coagulant aid is added at a ratio of 15 mg/L; after the brine waste water is coagulated fully in the reaction area, the product is moved to a sedimentation area of the high-density sedimentation tank for sedimentation; finally, sulfuric acid is added at the outlet of the high-density sedimentation tank to adjust the pH to about 7, and a non-oxidizing bactericide (product SMSJ-01D commercialized from SAMMEI company in Guangdong, China) is added to prevent contamination of the membrane. After the treatment, the hardness of the water outputted from the high-density sedimentation tank is 45 mg/L.

(7) The water outputted from the high-density sedimentation tank is filtered in a V-type filtering tank to remove suspended matters and colloidal solids, etc. in the water; finally, the turbidity in the waste water is controlled at about 3 NTU, and the water is fed to an ultrafiltration device. The ultrafiltration device operates at 0.05 MPa; after further treatment by ultrafiltration, the waste water has: hardness: 45 mg/L, COD: 50 mg/L, and turbidity 1 NTU.

(8) The waste water is fed to an electrodialysis device for further concentration, and the electrodialysis device operates at 20V voltage; to ensure stable operation of electrodialysis for a long period, the TDS in the produced water (fresh water) is controlled at about 25,000 mg/L by controlling the water production efficiency, the ammonia nitrogen concentration is 5 mg/L; then, the water is returned to a high pressure reverse osmosis membrane unit and treated by high pressure reverse osmosis treatment together with the concentrated water produced in the intermediate pressure reverse osmosis treatment; the TDS in the concentrated water is as high as 200,000 mg/L or above, the ammonia nitrogen content is 40 mg/L, and the concentrated water is fed to an evaporating crystallization unit.

(9) In the primary evaporating crystallization device, sodium sulfate that complies with the criteria for quality of Grade III industrial anhydrous sodium sulfate as specified in the national standard is obtained at 90° C. evaporation temperature and 40-70° C. crystallization temperature; the remaining mother liquid after crystallization is fed to a freezing crystallization device, and mirabilite at 90% or higher purity is further obtained at about −5° C. crystallization temperature; the remaining liquid is returned to the secondary evaporating crystallization device, and sodium chloride that complies with the quality criteria for Grade II refined industrial salt as specified in the national standard is obtained at 110° C. evaporation temperature and 20-40° C. crystallization temperature; the TDS in the remaining mother liquid after secondary evaporating crystallization is controlled to be 400,000 mg/L or higher, and the mother liquid is recirculated to the primary evaporating crystallization device to further treat the remaining salt content in the mother liquid by evaporating crystallization. Three crystallized products with acceptable purity are obtained through a cyclic process by controlling the conditions, and the recovery efficiency of water and salts is improved. The recirculated mother liquid is circulated to the biological aerated filter for treatment, when the accumulated COD in the mother liquid is too high (e.g., about 10,000 mg/L).

By the above process, the cost of the waste water treatment is RMB16 yuan per ton brine waste water, the service life of the intermediate pressure reverse osmosis membrane and the high pressure reverse osmosis membrane is up to 5 years, and the service life of the electrodialysis membrane is up to 5 years. Thus, the operating period of the device can be 5 years.

Example 4

Waste water from the same source is treated with the method described in the Example 3, but the operating pressure of the intermediate pressure reverse osmosis membrane is 2.5 MPa, and the operating pressure of the high pressure reverse osmosis membrane is 2.8 MPa. The result is: the cost of waste water treatment is RMB27 yuan per ton brine waste water, the service life of the intermediate pressure reverse osmosis membrane and the high pressure reverse osmosis membrane is up to 5 years, and the service life of the electrodialysis membrane is up to 3 years.

Example 5

Waste water from the same source is treated with the method described in the Example 3, but the Fenton treatment step is excluded; namely, the concentrated water produced in high pressure reverse osmosis treatment is directly treated by biochemical treatment. The result is: the cost of waste water treatment is RMB25 yuan per ton brine waste water, the service life of the intermediate pressure reverse osmosis membrane and the high pressure reverse osmosis membrane is up to 5 years, and the service life of the electrodialysis membrane is up to 2.5 years.

Examples 6-9

Waste water from the same source is treated with the method described in the Example 3, but the microbial inocula II-D, II-E, II-F and II-G are used respectively. The result are: the costs of waste water treatment are RMB22, RMB22, RMB20, and RMB26 yuan per ton brine waste water, the service lives of the intermediate pressure reverse osmosis membrane and the high pressure reverse osmosis membrane are up to 5 years, and the service lives of the electrodialysis membrane are up to 4 years, 4 years, 4 years, and 2.5 years respectively.

Comparative Example 1

Waste water from the same source is treated with the method described in the Example 3, but the electrodialysis membrane is operated at 70V, in order to make the fresh water produced in electrodialysis meet the criteria for reuse and avoid returning the fresh water to the high pressure reverse osmosis membrane. The result is: the cost of waste water treatment is RMB28 yuan/ton, the service life of the intermediate pressure reverse osmosis membrane and the high pressure reverse osmosis membrane is 5 years, and the service life of the electrodialysis membrane is 1.5 years.

Comparative Example 2

Waste water from the same source is treated with the method described in the Example 3, but the fresh water produced in the electrodialysis is returned to the intermediate pressure reverse osmosis membrane unit. The result is: the cost of waste water treatment is RMB26 yuan/ton, the service life of the intermediate pressure reverse osmosis membrane and the high pressure reverse osmosis membrane is up to 5 years, and the service life of the electrodialysis membrane is up to 3 years.

Comparative Example 3

Waste water from the same source is treated with the method described in the Example 3, but the biochemical treatment step is arranged between the intermediate pressure reverse osmosis treatment and the high pressure reverse osmosis treatment. The result is: the cost of waste water treatment is RMB25 yuan/ton, and the service life of the electrodialysis membrane is up to 3 years.

The invention claimed is:
1. A method for treatment of brine waste water, comprising:
   (1) a pretreatment step wherein the brine is subject to softening, coagulation and sedimentation, rough filtration, and ultrafiltration to obtain a pretreated brine;
   (2) a reverse osmosis treatment step that comprises passing the pretreated brine to an intermediate pressure reverse osmosis filter to produce a first diluted water and a first concentrate water, passing the first concen- trate water to a high pressure reverse osmosis filter to produce a second diluted water and a second concentrate water;

(3) a biochemical treatment step that comprises treating the second concentrate water in a membrane bioreactor containing a salt-tolerant microbial inoculum and a microbial growth promoter to reduce a COD value and a total nitrogen concentration in the second concentrate water and discharging the bio-treated water from the membrane bioreactor;

(4) an electrodialysis concentration step that comprises subjecting the bio-treated water obtained from step (3) to softening, coagulation and sedimentation, rough filtration, and ultrafiltration to produce a filtered, bio-treated water; and electrodialyzing the filtered, bio-treated water to produce a third diluted water and a third concentrate water;

combining the third diluted water and the first concentrate water to produce a feed water for the high pressure reverse osmosis filter; and subjecting the third concentrate water to a crystallization step to obtain crystallized salts.

2. The method according to claim 1, wherein the high pressure reverse osmosis filter and the intermediate pressure reverse osmosis filter are operated at a pressure differential of 0.5-5 MPa.

3. The method according to claim 2, wherein an operating pressure of the intermediate pressure reverse osmosis filter is 0.5-5 MPa.

4. The method according to claim 1, further comprising oxidizing the second concentrate water from the high pressure reverse osmosis filter in a Fenton reaction to decrease a COD value by 20% or more and to increase a B/C value by 50% or more.

5. The method according to claim 1, wherein the biochemical treatment step reduces, in the second concentrate water, ammonium-nitrogen by 90% or more, decreases the COD value to 200 mg/L or less, and decreases a nitrate nitrogen concentration to 50 mg/L or lower.

6. The method according to claim 1, wherein the biochemical treatment is carried out in the presence of a salt-tolerant microbial inoculum and a microbial growth promoter, the salt-tolerant microbial inoculum contains *Kocuria palustris* FSDN-A and/or *Staphylococcus cohnii* FSDN-C, and *Paracoccus denitrificans* DN-3 and/or *Methylobacterium phyllosphaerae* SDN-3, wherein, the *Kocuria palustris* FSDN-A and *Staphylococcus cohnii* FSDN-C are being preserved in China General Microbiological Culture Collection Center (CGMCC) on Jul. 14, 2011 and numbered as CGMCC No. 5061 and CGMCC No. 5062, respectively, the *Paracoccus denitrificans* DN-3 and *Methylobacterium phyllosphaerae* SDN-3 are being preserved in CGMCC and numbered as CGMCC No. 3658 and CGMCC No. 3660, respectively, wherein a quantity of the salt-tolerant microbial inoculum is 0.01-0.1 vol % of the waste water to be treated by biochemical treatment.

7. The method according to claim 1, wherein the microbial growth promoter comprises a metal salt, a polyamine, and an organic acid hydroxylamine, and a weight ratio of the metal salt to the polyamine to the organic acid hydroxylamine is 40-100:5-30:0.5-15, wherein a concentration of the microbial growth promoter in the waste water to be treated by biochemical treatment is 1-20 mg/L.

8. The method according to claim 7, wherein the weight ratio of the metal salt to the polyamine to the organic acid hydroxylamine is 50-80:10-20:2-10, and the concentration of the microbial growth promoter is 5-15 mg/L.

9. The method according to claim 1, wherein, in the membrane bioreactor, a concentration of an activated sludge inoculum is 3,000-5,000 mg/L, a concentration of dissolved oxygen is 1-5 mg/L, a pH value is 7-9, a temperature is 20-40° C., and an hydraulic retention time is 3-12 h.

10. The method according to claim 1, wherein, after the electrodialysis treatment step, the third concentrate water has a TDS of 200,000 mg/L or higher, an ammonia nitrogen content of 50 mg/L or lower, a TDS in the third diluate water of 25,000 mg/L or lower, and an ammonia nitrogen content in the third diluted water of 5 mg/L or lower.

11. The method according to claim 1, wherein the brine contains sodium sulfate and sodium chloride, and the crystallization step comprises: treating the third concentrate water by a primary evaporative crystallization to obtain sodium sulfate crystals and a primary mother liquid, freezing the primary mother liquid to obtain mirabilite and secondary mother liquid, and treating the secondary mother liquid by a secondary evaporative crystallization to obtain sodium chloride crystals and a tertiary mother liquid.

12. The method according to claim 11, wherein, in the primary evaporative crystallization, evaporation is carried out at a temperature of 50° C. to 150° C. and crystallization is carried out at a temperature of 50° C. to 100° C., freezing the primary mother liquid is carried out at −8° C. to 0° C., and, in the secondary evaporative crystallization, evaporation is carried out at a temperature of 50° C. to 150° C. and crystallization is carried out at a temperature of 30° C. to 50° C.

13. The method according to claim 1, wherein, in the brine, a COD value is 60-200 mg/L, a total hardness measured in $CaCO_3$ is 1,000-2,500 mg/L, a total alkalinity measured in $CaCO_3$ is 500-2,000 mg/L, a TDS value is 2,000-10,000 mg/L, an ammonia nitrogen concentration is 5-50 mg/L, and a nitrate nitrogen concentration is 20-100 mg/L.

* * * * *